(12) United States Patent
Miyake et al.

(10) Patent No.: US 6,681,437 B1
(45) Date of Patent: Jan. 27, 2004

(54) CLEANING TOOL FOR OPTICAL FIBER CONNECTORS

(75) Inventors: Taisei Miyake, Musashino (JP); Hitoshi Goto, Itano-gun (JP); Isao Iwakane, Tokushima (JP)

(73) Assignee: NTT Advanced Technology Corporation, Tokyo (JP)

( * ) Notice: Subject to any disclaimer, the term of this patent is extended or adjusted under 35 U.S.C. 154(b) by 0 days.

(21) Appl. No.: 09/559,879

(22) Filed: Apr. 27, 2000

(30) Foreign Application Priority Data

Apr. 30, 1999 (JP) .......................... 11-125262
Jul. 12, 1999 (JP) .......................... 11-198248

(51) Int. Cl.⁷ .............................. A47L 25/00
(52) U.S. Cl. ........................ 15/210.1; 15/97.1
(58) Field of Search .................. 15/104.002, 210.1, 15/231, 209.1, 104.93, 218.1, 218, 220.4, 97.1; 221/63; 220/523–526; 435/305.3; 206/813; G02B 6/36; B08B 11/00; A47L 25/00

(56) References Cited

U.S. PATENT DOCUMENTS

| 3,159,303 | A | * | 12/1964 | Betner .................. 220/270 |
| 3,647,990 | A |   | 3/1972  | Eul, Jr. et al. |
| 3,761,984 | A |   | 10/1973 | Hauschild et al. |
| 4,004,314 | A |   | 1/1977  | Post et al. |
| 4,232,787 | A | * | 11/1980 | Holiday .................. 206/443 |
| 4,354,292 | A |   | 10/1982 | Telestad et al. |
| 4,387,411 | A |   | 6/1983  | Clausen et al. |
| 4,420,080 | A | * | 12/1983 | Nakamura .................. 206/449 |
| 4,462,056 | A |   | 7/1984  | Kara |
| 4,498,113 | A |   | 2/1985  | Clausen et al. |
| 4,614,270 | A |   | 9/1986  | Oishi |
| 4,638,393 | A |   | 1/1987  | Oishi et al. |
| 4,645,295 | A |   | 2/1987  | Pronovost |
| 4,750,804 | A |   | 6/1988  | Osaka et al. |
| 4,792,876 | A |   | 12/1988 | Cook et al. |
| 4,953,929 | A |   | 9/1990  | Basista et al. |
| 5,117,528 | A |   | 6/1992  | Kanayama et al. |
| 5,220,703 | A |   | 6/1993  | Kanayama et al. |
| 5,375,698 | A | * | 12/1994 | Ewart et al. .................. 206/5.1 |
| 5,768,738 | A |   | 6/1998  | Lee |
| 5,813,081 | A |   | 9/1998  | Wang et al. |
| 5,958,555 | A | * | 9/1999  | Takeuchi et al. ............ 428/152 |
| 6,053,985 | A | * | 4/2000  | Cheswick et al. ............. 134/6 |

FOREIGN PATENT DOCUMENTS

| JP | 54-48216   | 4/1979  |
| JP | 55-65608   | 5/1980  |
| JP | 55-68107   | 5/1980  |
| JP | 55-114033  | 8/1980  |
| JP | 56-105321  | 8/1981  |
| JP | 57-147123  | 9/1982  |
| JP | 58-31509   | 3/1983  |
| JP | 58-23668   | 5/1983  |
| JP | 58-77820   | 5/1983  |
| JP | 62-176866  | 8/1987  |
| JP | 62-259214  | 11/1987 |
| JP | 63-82775   | 4/1988  |
| JP | 63-19934   | 6/1988  |
| JP | 63-231305  | 9/1988  |
| JP | 64-72382   | 3/1989  |
| JP | 2-5108     | 1/1990  |

(List continued on next page.)

Primary Examiner—Robert J. Warden, Sr.
Assistant Examiner—S Balsis
(74) Attorney, Agent, or Firm—Wenderoth, Lind & Ponack, L.L.P.

(57) ABSTRACT

The cleaning tool for optical fiber connectors has cleaning sheet laminated to the bottom surface of a front plate. A plurality of rows of slit shaped windows are opened through the front plate. Peel-off sheet is attached to the front plate to close off the windows. Peel-off sheet sealing off the windows is removed to open a window, an optical fiber connector is moved within the exposed window, and the connecting surface of the optical fiber connector is cleaned by the cleaning sheet.

27 Claims, 13 Drawing Sheets

FOREIGN PATENT DOCUMENTS

| | | |
|---|---|---|
| JP | 2-5109 | 1/1990 |
| JP | 2-264907 | 10/1990 |
| JP | 2-44333 | 11/1990 |
| JP | 3-10875 | 1/1991 |
| JP | 3-45279 | 4/1991 |
| JP | 4-2413 | 1/1992 |
| JP | 5-193239 | 8/1993 |
| JP | 6-242347 | 1/1994 |
| JP | 62-42347 | 2/1994 |
| JP | 6-68011 | 9/1994 |
| JP | 59-145720 | 9/1994 |
| JP | 2539020 | 7/1996 |

* cited by examiner

CLEANING TOOL FOR OPTICAL FIBER CONNECTORS

BACKGROUND OF THE INVENTION

This invention relates to a cleaning tool for removing dirt and foreign material from optical fiber connectors to make them clean.

An optical fiber connector has a connecting surface exposed at its end. The optical fiber connector 14 shown in FIG. 1 has optical fiber fixed at the center of a zirconia ceramic ferrule 15, and its connecting surface 16 is polished to a mirror surface. Optical fiber connectors 14 of this configuration are joined with connecting surfaces 16 in mutual opposition to transmit optical signals. If the connecting surfaces are dirty or foreign material is attached to the connecting surfaces when a pair of optical fiber connectors are joined, optical signals cannot be transmitted properly. This is because a dirty surface or foreign particles will block or reflect light in the optical fiber.

To avoid this problem it is necessary to clean the connecting surfaces before joining two optical fiber connectors together. The cleaning tool shown in FIG. 2 has been developed as a tool for cleaning optical fiber connectors (Japanese Patent Application HEI 6-242347, 1994). FIG. 3 shows the internal structure of the cleaning tool of FIG. 2 with the case 17 opened. As shown in FIG. 3, cleaning sheet 3 is wound in the form of tape inside the case 17. Cleaning sheet 3 is unwound by operation of a lever 18 provided on the case 17, and this moves cleaning sheet 3 which is exposed in windows 19 through the case 17. Each time the lever 18 is operated, a new portion of cleaning sheet 3 is exposed in the windows 19. Therefore, an optical fiber connector 14 connecting surface 16 can be polished clean by rubbing the connecting surface 16 against the cleaning sheet 3 exposed through the windows 19.

The cleaning tool shown in FIG. 2 is capable of cleaning optical fiber connecting surfaces with the cleaning sheet, but its overall construction is complex and it has the drawback of high manufacturing cost. In addition, because of its bulkiness, it also has the drawback of not being convenient to carry. Further, since the rolled cleaning sheet inside the case of this cleaning tool is moved via a lever, the case cannot be completely sealed-off and it has the drawback that dust and dirt can enter the case and attach to the cleaning sheet. If dirt attaches to the cleaning sheet, it can attach to a connecting surface when the optical fiber connector is rubbed against the cleaning sheet, and disrupt light transmission. In particular, dirt does not attach to the portion of the cleaning sheet which is wound tightly in a roll, but a portion of the cleaning sheet is unwound and exposed within the case for the purpose of transfer and delivery. The cleaning tool has the drawback that dirt easily attaches to this unwound portion of cleaning sheet. Finally, since particulates such as dust and dirt can enter the case when this type of a cleaning tool is used, for example, even if particulates are completely removed during manufacture and shipping of the cleaning tool, dust and dirt attachment cannot be eliminated.

The present invention was developed to further solve these types of problems and drawbacks. Thus it is a primary object of the present invention to provide a cleaning tool for optical fiber connectors which can be manufactured extremely inexpensively in quantity, and also is compact in its entirety allowing it to be carried conveniently. Further, another important object of the present invention is to provide a cleaning tool for optical fiber connectors which prevents dust and dirt from attaching to the cleaning sheet, and allows optical fiber connector cleaning under ideal conditions.

The above and further objects and features of the invention will more fully be apparent from the following detailed description with accompanying drawings.

SUMMARY OF THE INVENTION

The cleaning tool for optical fiber connectors of the present invention has cleaning sheet layered under the bottom surface of a front plate. A plurality of slit shaped windows are opened through the front plate. A peel-off sheet is attached to the front plate in a manner which seals off the plurality of windows. The cleaning tool is used to clean an optical fiber connecting surface with a cleaning sheet by removing a peel-off sheet to open a sealed off window, and by moving the optical fiber connector inside the opened window.

This configuration of cleaning tool for optical fiber connectors has the feature that it can be manufactured extremely inexpensively in quantity and is compact in its entirety allowing it to be carried conveniently. This type of cleaning tool does not have an overall complex structure, and does not incur the high manufacturing cost of prior art cleaning tools. This cleaning tool uses an extremely simple structure to can clean an optical fiber connecting surface. Consequently, the cleaning tool for optical fiber connectors of the present invention has the feature of being lightweight, compact, and extremely easy to carry, in addition to being capable of in expensive manufacture in quantity.

Further, this configuration of cleaning tool for optical fiber connectors has the feature that it prevents dust and dirt from attaching to the cleaning sheet, and allows optical fiber connector cleaning under Ideal conditions. Each time the cleaning tool described above is used to clean an optical fiber connecting surface, a peel-off sheet Is removed and new cleaning sheet is used. Therefore, unused portions of the cleaning tool remain sealed off, and dust and dirt is reliably prevented from entering the tool and attaching to the cleaning sheet. Namely, a clean-process manufactured state free of particulates can be maintained until the peel-off sheet is removed and the tool is used.

Further, the cleaning tool for optical fiber connectors of the present invention can be configured as a cleaning cartridge with cleaning sheet layered under the bottom surface, and peel-off sheet attached to the top surface of a front plate, which can be attached or detached from a main case. This cleaning tool is used, with a cleaning cartridge attached to the main case, by removing a peel-off sheet to open a sealed window. Next the ferrule region and end surface of an optical fiber connector plug is moved inside the opened window to clean the surface with the cleaning sheet. A cleaning cartridge with all its cleaning regions used is removed from the main case and exchanged for a new one.

Further, in the cleaning tool for optical fiber connectors of the present invention, the main case has a cavity at the attachment surface of the cleaning cartridge, and a cushion sheet is provided in this cavity. When the ferrule region of an optical fiber connector plug is pushed against, and rubbed on the cleaning sheet, the cushion sheet resiliently pushes against the plug end surface. Consequently, this type of cleaning tool can more efficiently clean an optical fiber connector plug ferrule region and end surface.

DETAILED DESCRIPTION OF THE INVENTION

Figure 1:
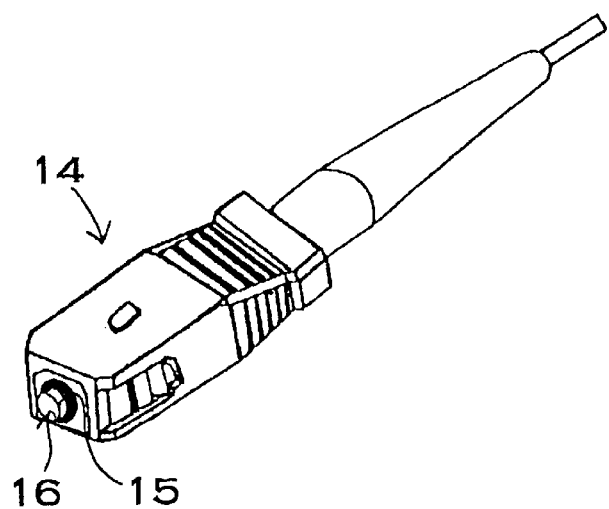
FIG. 1 is an oblique view showing an optical fiber connector.
Figure 2:
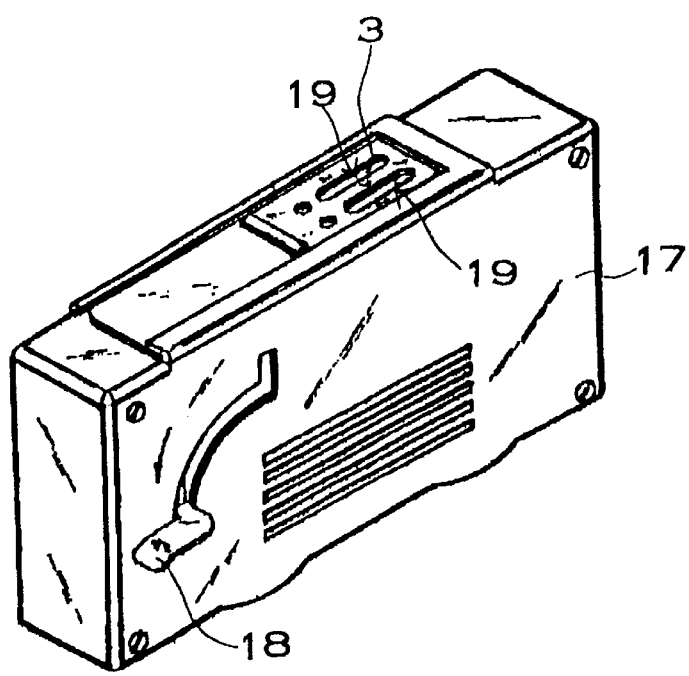
FIG. 2 is an oblique view showing a prior art cleaning tool for optical fiber connectors.
Figure 3:
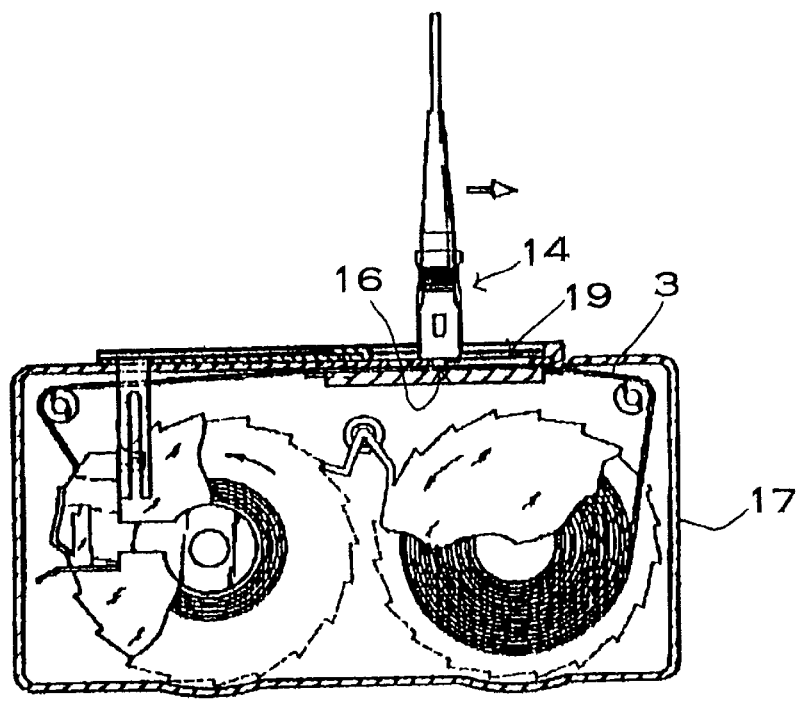
FIG. 3 is a front view showing the cleaning tool for optical fiber connectors of FIG. 2 with the case open.
Figure 4:
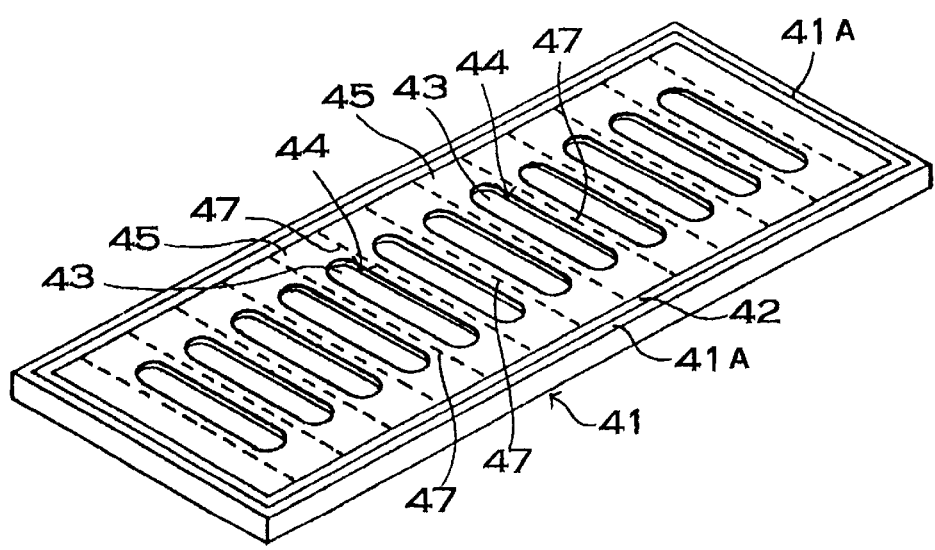
FIG. 4 is an oblique view showing an embodiment of the cleaning tool for optical fiber connectors of the present invention.
Figure 5:
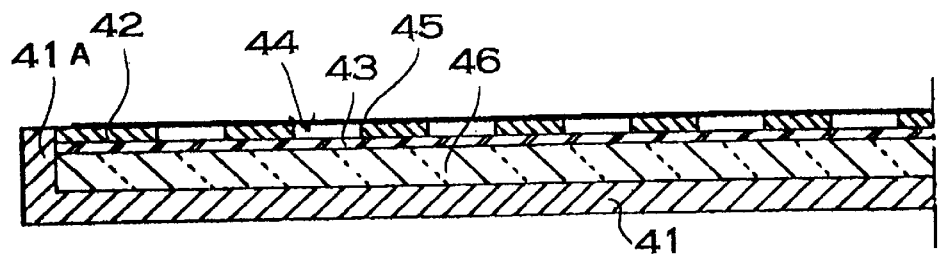
FIG. 5 is an enlarged lengthwise cross section view of the cleaning tool for optical fiber connectors shown in FIG. 4.

The cleaning tool for optical fiber connectors shown in the oblique view of FIG. 4 and the enlarged cross section view of FIG. 5 has a cleaning sheet 43 layered between a bottom plate 41 and a front plate 42. The front plate 42 has a plurality of rows of slit shaped windows 44 opened through it. Further, separated peel-off sheets, which can be stripped off, are attached to close off the plurality of windows 44 provided in the front plate 42.

The front plate 42 and bottom plate 41 are made of plastic or paper. A plastic bottom plate 41 is provided with perimeter walls 41A formed as a single piece with the bottom plate 41. The front plate 42 is pressure fit and retained inside the perimeter walls 41A. The front plate 42 is retained by the bottom plate 41 perimeter walls 41A by bonding, by weld attachment, or by pressure fitting. A cleaning tool with the front plate 42 fixed to the bottom plate 41 can be discarded after use. However, a cleaning tool with the front plate 42 joined to the bottom plate 41 in a removable fashion can be used repeatedly by removing the front plate 42 and replacing the cleaning sheet 43. In this case after use, peel-off sheets attached to the front plate windows have been removed. Therefore, when the cleaning sheet is replaced, the front plate is also replaced with one having peel-off sheets attached, or peel-off sheet is attached to seal off the windows of the front plate which was removed.

In a cleaning tool with a paper or cardboard bottom plate and front plate, the front plate and bottom plate are joined by bonding their perimeter. This type of cleaning tool has the feature that it can be manufactured in quantity extremely inexpensively.

The front plate 42 has a plurality of rows of windows 44 opened through it. The width of the windows 44 is large enough to allow the ferrule region of an optical fiber connector plug to be reliably inserted. In addition, the windows 44 have a sufficient overall length to allow the inserted ferrule region of an optical fiber connector plug to be cleaned by rubbing it back and forth against the cleaning sheet 43 inside a window 44. The front plate 42 shown in the figures is provided with a plurality of rows of parallel slit shaped windows 44. These windows 44 are beveled in circular arc shapes at both end regions to conform to the circular cylindrical shaped ferrule region. However, the windows may also be formed in rectangular shapes.

The bottom plate 41 is made thick enough to be sufficiently strong. The front plate 42 thickness is made 0.2 mm to 1.5 mm, preferably 0.3 mm to 1.0 mm, and more preferably 0.3 mm to 0.8 mm. A cleaning tool with a front plate 42 of this thickness has shallow slit shaped windows 44, and is convenient to use without inserting the optical fiber connecting surface deeply into a window 44. However, if the front plate is made too thin, it becomes difficult to move the optical fiber connecting surface back and forth within the slit shaped window. This is because the window 44 acts as a guide to move the optical fiber connecting surface back and forth to rub against the cleaning sheet 43 for cleaning.

Although not illustrated, the bottom plate can be provided with protrusions coincident with the windows. A cleaning tool with these protrusions enables the cleaning sheet to project outward within the window boundaries. A cleaning tool with cleaning sheet projecting from the windows allows convenient use with a thicker front plate. This is because a cleaning sheet which projects outward effectively makes the window shallower.

The cleaning sheet 43 is sheet material capable of cleaning a optical fiber connecting surface by rubbing or polishing. For example, cloth woven from minute fibers, or dry processed or wet processed non-woven fiber material can be used. Cleaning sheet 43, which does not result in separation and attachment of material such as fibers to the connecting surface when it is rubbed against the cleaning sheet 43, is optimum. The cleaning sheet 43 is sandwiched between the bottom plate 41 and the front plate 42, and retained in a fixed position. The cleaning tool shown in the figures has a cushion sheet 46 layered between the bottom plate 41 and the cleaning sheet 43. The cushion sheet 46 is foam-processed plastic foam or flexible rubber sheet. The cushion sheet 46 resiliently pushes upwards on the cleaning sheet 43. When an optical fiber connecting surface is pushed onto, and rubbed against the cleaning sheet 43, this configuration has the characteristic that the entire connecting surface is uniformly pushed on by the cleaning sheet 43, and the entire connecting surface is cleaned. In particular, even when the optical fiber connecting surface is pushed against the cleaning sheet 43 at a slight angle (off perpendicular), the cleaning sheet 43 makes contact with the entire connecting surface and the entire connecting surface can be cleaned. The cushion sheet 46 thickness is, for example, 0.5 mm to 5 mm, preferably 1 mm to 3 mm, and optimally 1 mm to 2 mm.

Figure 6:
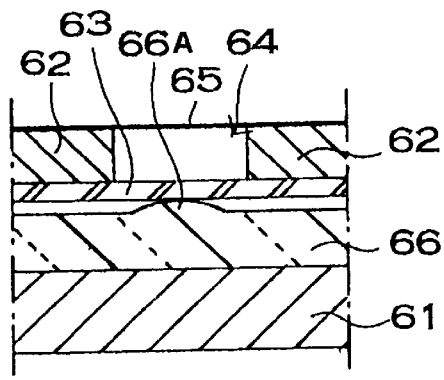
FIG. 6 is an enlarged lengthwise cross section view showing an important element of an example of a cushion sheet.
Figure 7:
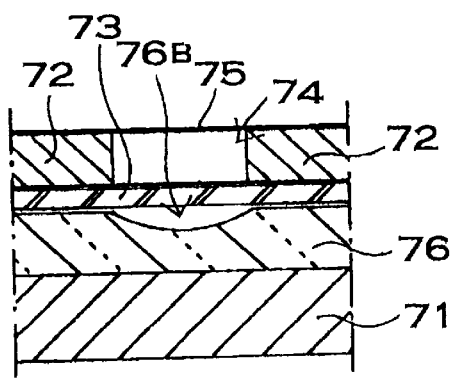
FIG. 7 is an enlarged lengthwise cross section view showing an important element of another example of a cushion sheet.

Further, as shown in the cross section of FIG. 6, the cushion sheet 66 may be provided with protrusions 66A coincident with the windows 64. The protrusions 66A resiliently push upwards on the cleaning sheet 63 within the windows 64. This type of cushion sheet 66 can be thin overall and efficiently push the cleaning sheet 63 against the optical fiber connecting surface. Moreover, as shown in FIG. 7, the cushion sheet 76 may also be provided with grooves 76B in the window 74 regions. When an optical fiber connecting surface is pressed against the cleaning sheet 73 of this grooved cleaning tool, the cleaning sheet 73 flexibly deforms and pushes against the optical fiber connecting surface. Consequently, this configuration of cleaning tool also has the characteristic that the cleaning sheet 73 is uniformly pushed against the entire connecting surface to clean that surface. In these figures, 61 and 71 indicate the bottom plate, 62 and 72 indicate the front plate, and 65 and 75 indicate the peel-off sheet.

The cushion sheet 46 is attached to the backside of the cleaning sheet 43 with adhesive, or it is layered with the cleaning sheet 43, sandwiched between the front plate 42 and the bottom plate 41, and retained in a fixed position without adhesion. In a cleaning tool having a cushion sheet 46 and cleaning sheet 43 with the same shape as the interior shape of the bottom plate 41, the cushion sheet 46 and cleaning sheet 43 can be sandwiched between the front plate 42 and the bottom plate 41, and retained without moving in position.

Peel-off sheet 45 is attached to the front surface of the front plate 42. Peel-off sheet 45 is attached to the front plate 42 to seal off the plurality of windows 44 provided in the front plate 42. Peel-off sheet 45 is attached with adhesive, or it is thermally fused to a plastic front plate 42 for attachment without using an adhesive. Peel-off sheet 45 is attached to the front plate 42 in a manner allowing separate removal to independently expose any window 44. The peel-off sheet 45 shown in the figures is provided with break-away lines 47 at boundaries between adjacent windows 44 allowing easy separation. The break-away lines 47 make the peel-off sheet 45 thinner at the lines, or cut or perforate the peel-off sheet 45 locally making it easy to break-away. The attached portion of this type of peel-off sheet 45 is stripped off to expose an independent window 44. The peel-off sheet may also be configured with break-away lines 47 provided coincident with the boundaries of the windows. This type of peel-off sheet does not strip off the attached portion, but separates at the break-away lines to expose a window.

However, the peel-off sheet may also strip off without separation. This peel-off sheet is provided with no break-away lines or cuts, and the peel-off sheet is pulled from one end in a designated direction. Front plate windows are successively opened and cleaning sheet exposed as the peel-off sheet Is removed from the front plate. In this manner, peel-off sheet which is not separated does not produce numerous pieces of peeled off sheet, and it has the characteristic of very clean use.

In a cleaning tool with the configuration described above, peel-off sheet 45 sealing off a window 44 is removed to open that window 44 when an optical fiber connecting surface is to be cleaned by the cleaning sheet 43. Cleaning sheet 43 is exposed in the opened window 44. In this state, the optical fiber connector is moved within the window 44, the optical fiber connecting surface is polished by the cleaning sheet 43, and dirt attached to the connecting surface is removed cleaning the surface.

Figure 8:
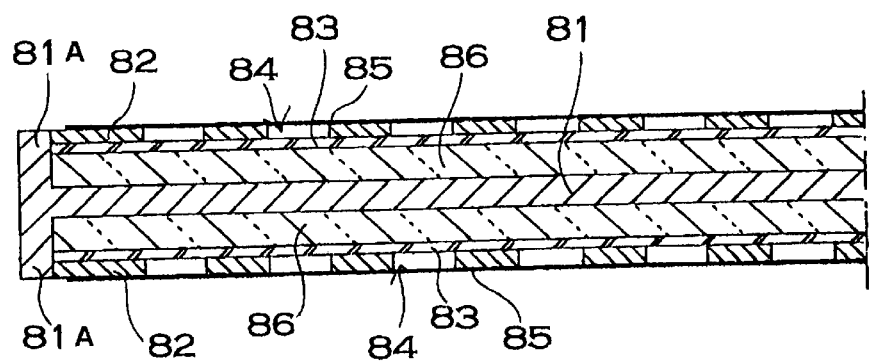
FIG. 8 an enlarged cross section view of another embodiment of the cleaning tool for optical fiber connectors of the present invention.

The cleaning tool shown in FIG. 8 is configured with cleaning sheets 83 and front plates 82 layered on both sides of the bottom plate 81 allowing use of both sides. This type of cleaning tool has twice the utility of a cleaning tool with a cleaning sheet and front plate provided on one side of the bottom plate. In this figure, 81A indicates perimeter walls, 84 indicates windows through the front plate, 85 indicates peel-off sheet, and 86 indicates the cushion sheet.

Figure 9:
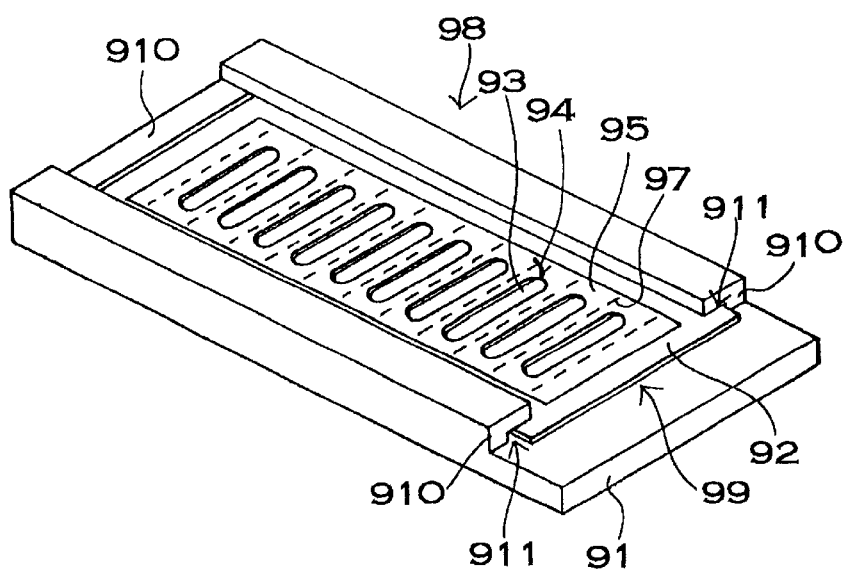
FIG. 9 is an oblique view of another embodiment of the cleaning tool for optical fiber connectors of the present invention.
Figure 10:
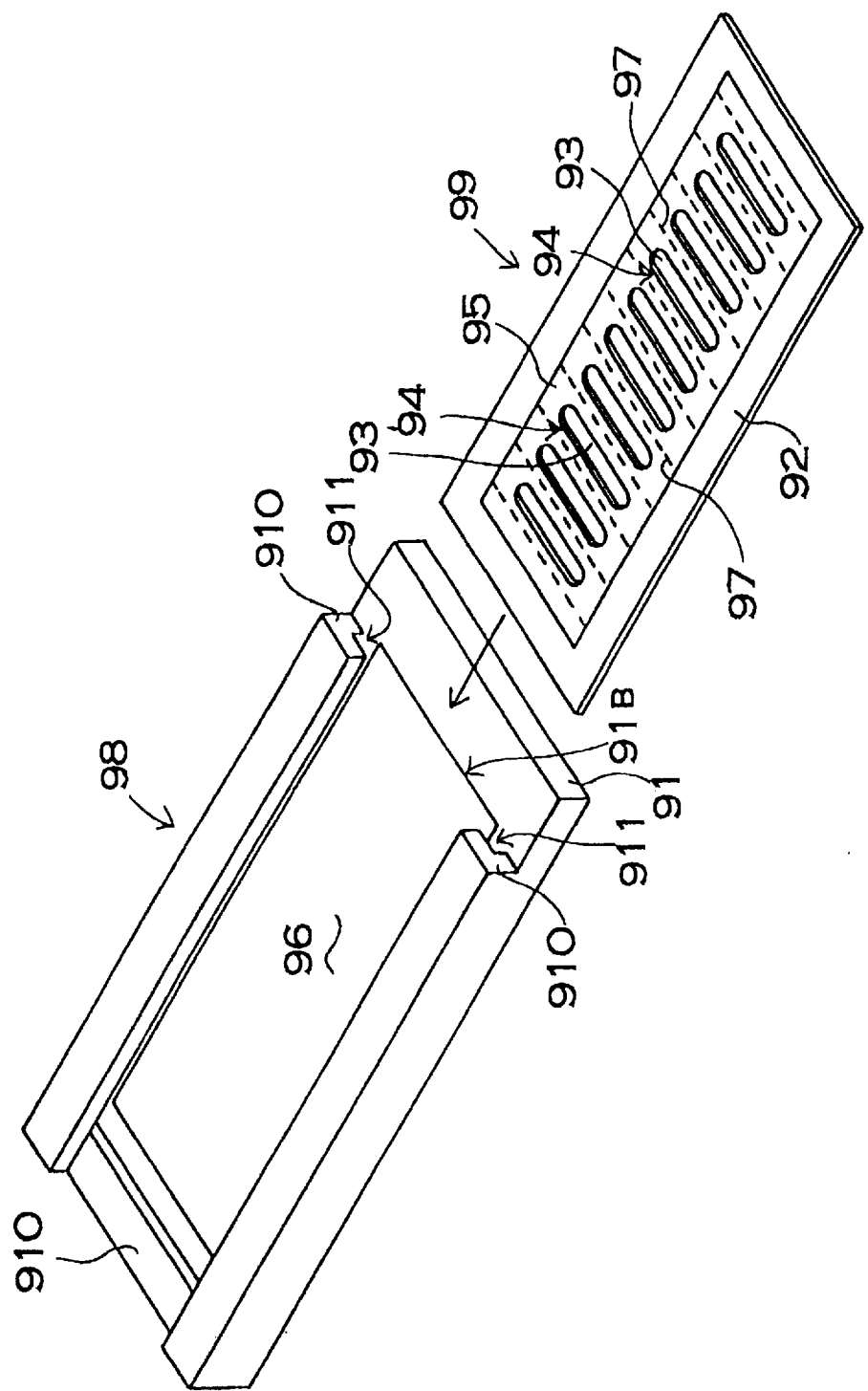
FIG. 10 is an exploded oblique view of the cleaning tool for optical fiber connectors shown in FIG. 9.
Figure 11:
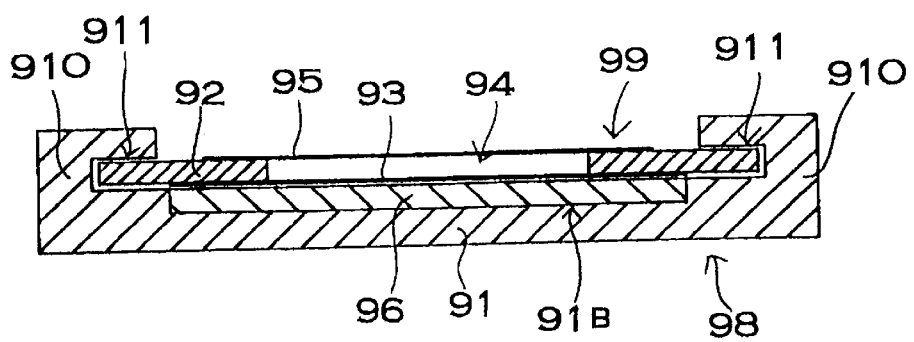
FIG. 11 is an end-on cross section view of the cleaning tool for optical fiber connectors shown in FIG. 9.

The cleaning tool for optical fiber connectors shown in the oblique view of FIG. 9, the exploded oblique view of FIG. 10, and the cross section view of FIG. 11 is provided with a cleaning cartridge 99 and a main case 98 for attachment of the cleaning cartridge 99 in a detachable manner. The cleaning cartridge 99 is provided with a front plate 92 with a plurality of rows of windows 94 opened through it, a cleaning sheet 93 layered beneath the bottom surface of the front plate 92, and peel-off sheet 95 which is attached to the upper surface of the front plate 92 in a manner which seals off the plurality of windows 94 provided in the front plate 92 and which can be removed by peeling.

The front plate 92, cleaning sheet 93, windows 94, and peel-off sheet 95 are the same as those of the cleaning tool embodiment shown in FIGS. 4 and 5, and their explanation Is abbreviated. Structural elements of the cleaning tool shown in FIGS. 9 through 11 which are the same as those of the cleaning tool shown in FIGS. 4 and 5 have the same low order digit number designator (dropping the high order digit). Further, in subsequent embodiments, structural elements which are the same as those of the cleaning tool shown in FIGS. 9 through 11 have the same lower order digits. In this case, dropping two high order digits for subsequent embodiment designators results in the same number as dropping one high order digit for FIGS. 9 through 11 designators.

Figure 12:
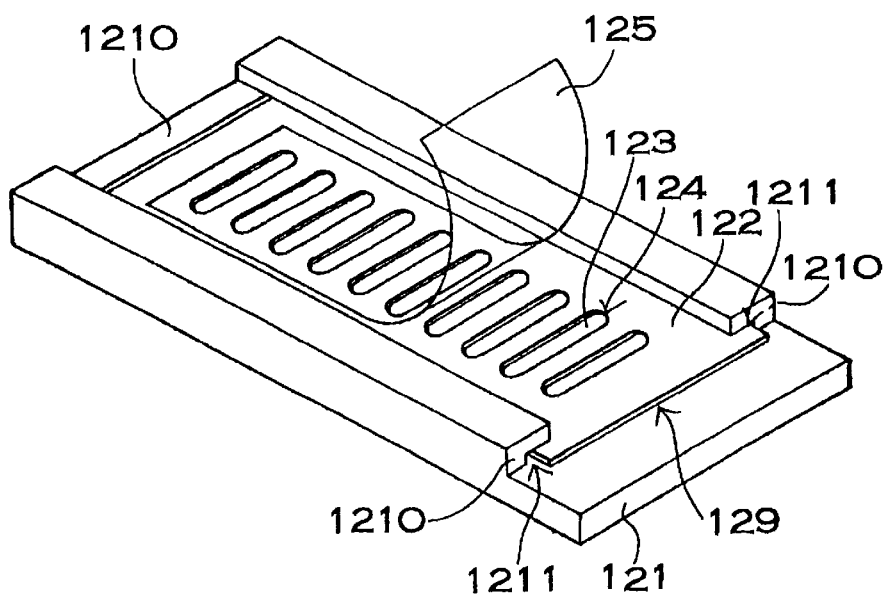
FIG. 12 is an oblique view of another embodiment of the cleaning tool for optical fiber connectors of the present invention.

In the cleaning tool shown in FIG. 12, the peel-off sheet 125 is not provided with break-away lines or cut lines, and the peel-off sheet 125 is removed by pulling one end in a designated direction. Windows 124 are successively opened and cleaning sheet 123 exposed as peel-off sheet 125 is removed from the front plate 122.

Turning back to the cleaning tool shown in FIGS. 9 through 11, the main case 98 is formed as plate having an outline somewhat larger than the that of the cleaning cartridge 99. The main case 98 has insertion grooves 911 along both sides to slide a cleaning cartridge 99 and attach it to the main case 98 in a detachable manner. The main case 98 is provided with perimeter walls 910 on both sides and along one end of the bottom plate 91. The upper parts of the perimeter walls 910 on both sides of the bottom plate 91 extend towards the center of the bottom plate 91 providing c-shaped grooves inside the walls and forming the cleaning cartridge insertion grooves 911. A cleaning cartridge 99 is inserted into the insertion grooves 911 provided on the inside of the perimeter walls 910 and attached in a fixed position on the main case 98. Although not illustrated, the main case may also be configured with a stopper near the cleaning cartridge insertion region to retain the cleaning cartridge in a fixed position. A cleaning cartridge held in a fixed position on the main case has the characteristic that it does not move out of position or slide out of the main case and is convenient to use.

The main case 98 is made of plastic, wood materials, or metal. A plastic main case can be formed as a single piece with perimeter walls along the bottom plate perimeter to provide insertion grooves. Insertion grooves can be formed in a wooden main case by laminating and bonding sheet material cut and formed to specified shapes. Insertion grooves can be formed in a metal main case by bending the perimeter of a metal sheet or providing perimeter walls by a method such as weld attachment. The bottom plate 91 is made thick enough to have sufficient strength.

The bottom plate 91 is designed with a strength that prevents deformation even when an optical fiber connector plug is moved back and forth inside a window 94 in the front plate 92 and the ferrule region is pushed strongly against the cleaning tool. This is because the optical fiber connector plug end surface is cleaned by rubbing the ferrule region back and forth on the cleaning sheet 93 with pressure applied.

The cleaning tool shown in FIGS. 9 through 11 has a cushion sheet 96 layered in the center region of the bottom plate 91. The cushion sheet 96 has a size approximately equal to that of the cleaning sheet 93. The cushion sheet 96 is disposed in a cavity 91B provided in the center region of the bottom plate 91. The cavity 91B in the bottom plate 91 has a length, width, and depth which allows the cushion sheet 96 to fit into the cavity 91B. The cushion sheet 96 is retained in a fixed position on the bottom plate 91 by bonding it with adhesive into the bottom plate 91 cavity 91B.

The same cushion sheet 46 used in the cleaning tool shown in FIGS. 4 and 5 can be used as the cushion sheet 96. Further, the cushion sheet 96 can also be made to push the cleaning sheet against an optical fiber connecting surface by the same configuration as previously described for the embodiments shown in FIGS. 6 and 7. However, these cushion sheets disposed within a cavity in the bottom plate are designed to allow a cleaning cartridge to be smoothly attached or detached.

The cleaning tool with the configuration described above is used by inserting a cleaning cartridge 99 into the main case 98. Peel-off sheet 95 sealing off a window 94 is removed to open that window 94 when an optical fiber connecting surface is to be cleaned by the cleaning sheet 93. Cleaning sheet 93 is exposed in the opened window 94. In this state, the optical fiber connector is moved within the window 94, the optical fiber connecting surface is polished by the cleaning sheet 93, and dirt attached to the connecting surface is removed cleaning the surface.

Further, a cleaning cartridge 99 with all the cleaning regions of the its cleaning sheet 93 used, is removed from the main case 98 and exchanged for a new one. A cleaning cartridge 99 which is used up is either thrown away or the front plate 92 only is separated and reused.

Figure 13:
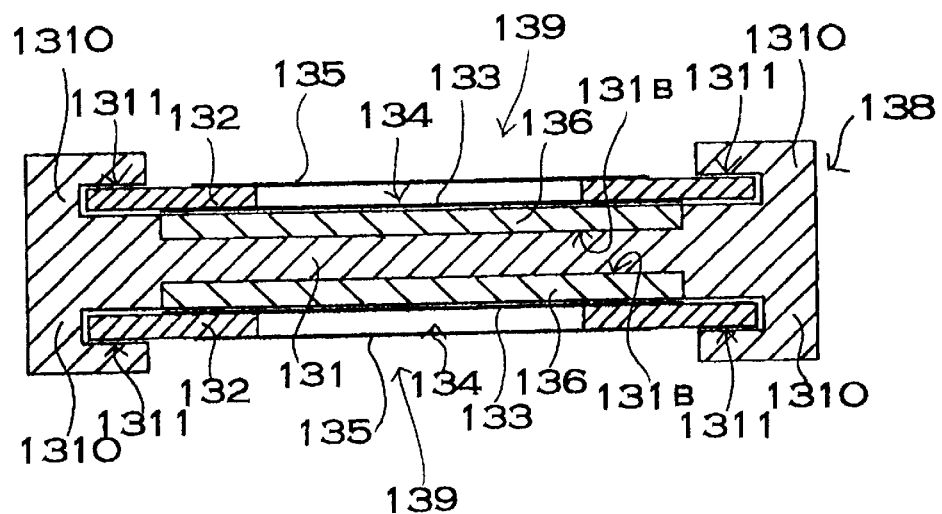
FIG. 13 is an end-on cross section view of another embodiment of the leaning tool for optical fiber connectors of the present invention.

Turning to the cleaning tool shown in FIG. 13, the main case 138 is configured to allow attachment of cleaning cartridges 139 to both sides of the bottom plate 131. The main case 138 in FIG. 13 is provided with insertion grooves 1311 on both sides of the bottom plate 131, and cleaning cartridges 139 insert and attach in these insertion grooves 1311. Further, the main case 138 shown in FIG. 13 has cushion sheets 136 disposed on both sides of the bottom plate 131. In this type of cleaning tool, when the cleaning regions on one side are completely used, the cleaning tool is turned over and cleaning regions on the other side are used. Therefore, it has the characteristic of twice the utility of a cleaning tool with a cleaning cartridge attached to one side.

However, a cushion sheet may also be disposed on only one side of the bottom plate. In this cleaning tool, the side of the main case with the cushion sheet is used as the cleaning side and the back side is used for spare cleaning cartridge attachment. When all the cleaning regions on the cleaning side are used up, the used cleaning cartridge is removed and conveniently exchanged for the spare cleaning cartridge stored on the back side. Since cushion sheet is disposed on only one side of the bottom plate of this cleaning tool, it has the characteristic of low manufacturing cost for the main case.

Figure 14:
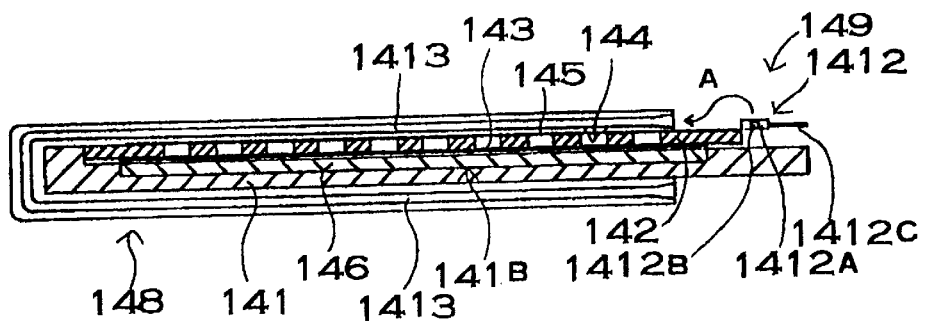
FIG. 14 is a lengthwise cross section view of another embodiment of the cleaning tool for optical fiber connectors of the present invention.
Figure 15:
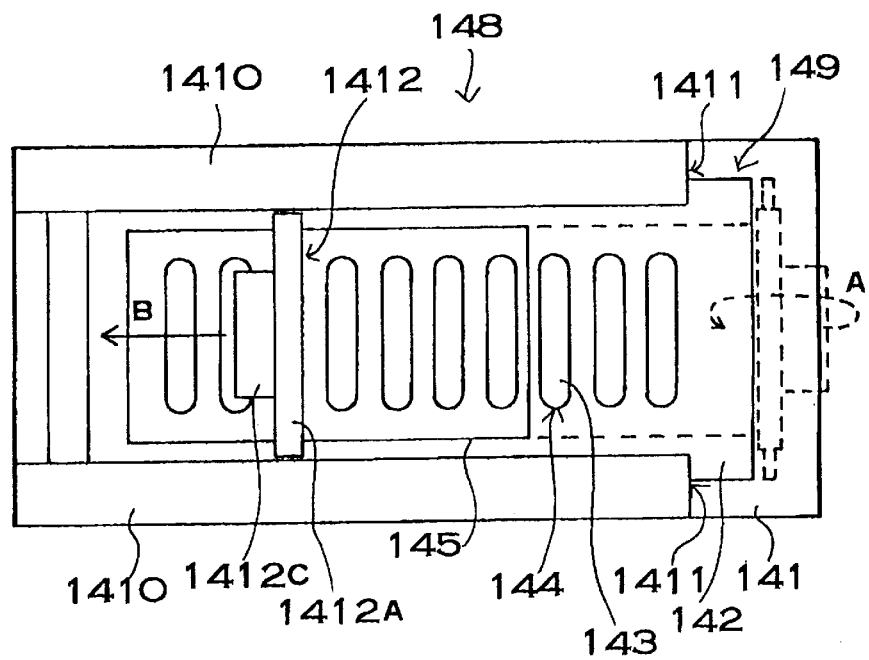
FIG. 15 is a plan view showing the cleaning tool for optical fiber connectors of FIG. 14 with its peel-off sheet being removed.
Figure 16:
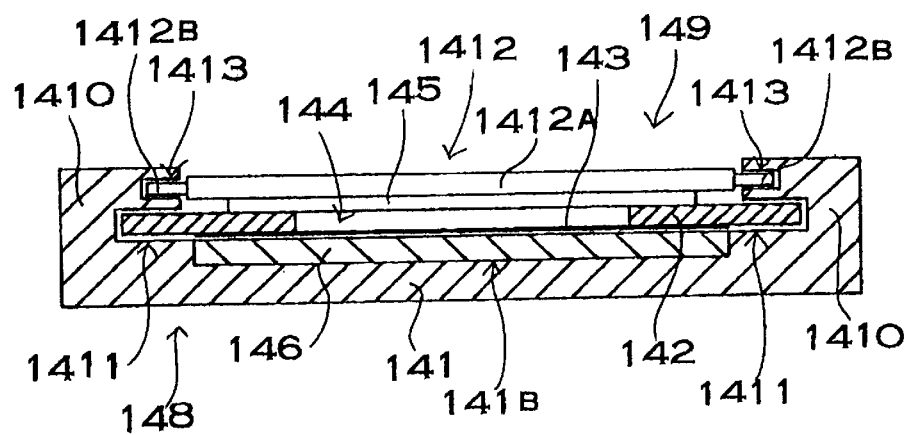
FIG. 16 is an end-on cross section view of the cleaning tool for optical fiber connectors shown in FIG. 15.

FIGS. 14 through 16 show another embodiment of a cleaning tool where the peel-off sheet 145 attached to the front plate 142 peels of without partitioning. In the cleaning tool shown in these figures, a guide tab 1412 is disposed at the end of the peel-off sheet 145. Further, guide grooves 1413 are provided parallel to main case 148 insertion grooves 1411 in this cleaning tool, and the peel-off sheet 145 is removed by moving the guide tab 1412 within the guide grooves 1413.

As shown in FIG. 14, the guide tab 1412 is fixed to the end of the peel-off sheet 145. A shown in FIG. 16, both ends of the guide tab 1412 insert into the guide grooves 1413, and the guide tab 1412 is moved along the guide grooves 1413. The guide tab 1412 shown in the figures has a bar shaped body 1412A with thickness less than its width, which is provided with guide projections 1412B jutting out from both ends. The guide projections 1412B of the guide tab 1412 are inserted into the guide grooves 1413, the guide projections 1412B are moved within the guide grooves 1413, and the peel-off sheet 145 is moved in the direction which removes it. The guide tab 1412 shown in the figures has a body 1412A length approximately equal to the gap distance between opposing guide grooves 1413, and the guide projections 1412B are made thinner than the body 1412A. This type of guide tab 1412 has the characteristic of translational motion along the guide grooves 1413 without allowing the guide tab 1412 to slant within the gap between opposing guide grooves 1413. Further, the guide tab 1412 is provided with a grip region 1412C to its side.

As shown in FIG. 16, the guide grooves 1413 are formed in the ends of the perimeter walls 1410 which bend over and extend towards the interior of the cleaning tool. The guide grooves 1413 extend in the direction of cleaning cartridge 149 insertion and are established parallel to the insertion grooves 1411. Further, to allow removal of the entire peel-off sheet 145 to expose all of the windows 144, the guide grooves 1413 make a U-turn around the end of the main case 148 and extend to the back side of the main case 148 which is opposite the side for cleaning cartridge 149 insertion.

A cleaning tool with the configuration described above is used by inserting a cleaning cartridge 149 in the main case 148, then folding over the guide tab 1412 from the position shown in FIG. 14 (the broken line position of FIG. 15) according to arrow A of FIG. 14, and inserting both ends of the guide tab 1412 into the guide grooves 1413. The guide tab 1412, which is inserted in the guide grooves 1413, is pulled along the surface of the cleaning cartridge 149 as shown by arrow B of FIG. 15 to remove peel-off sheet 145 beginning at the guide tab 1412 end. In this cleaning tool, peel-off sheet 145 is removed to open successive windows 144 from the end of the cleaning cartridge 149. The ferrule region of an optical fiber connector plug is rubbed against cleaning sheet 143 exposed in an opened window 144 to remove dirt attached to the connecting surface and clean the connecting surface.

The cleaning tool for optical fiber connectors described above has the characteristic that clear distinction is made between the part which can be discarded after use and the part which is reused without discarding, and the part which is discarded can be easily replaced. In this type of cleaning tool, with a cleaning cartridge attached to the main case, peel-off sheet which seals off the windows is removed to expose a window, an optical fiber connector plug is moved within the open window, and the ferrule region and plug end surface are cleaned by the cleaning sheet in an Ideal fashion. Further, a cleaning cartridge with all its cleaning regions used up is removed from the main case and exchanged for a new one in an extremely simple fashion. Consequently, the cleaning tool of the present invention has the characteristic that in addition to being compact overall and convenient to carry, the part discarded after use and the reusable part which is not discarded are clearly distinguished, the discarded part is easily replaced, and the cleaning tool is extremely economic to use. In particular, since the cleaning cartridge of the cleaning tool of the present invention has a simple structure, manufacturing cost per use cycles can be reduced, and manufacture in quantity can be extremely inexpensive.

Figure 19:
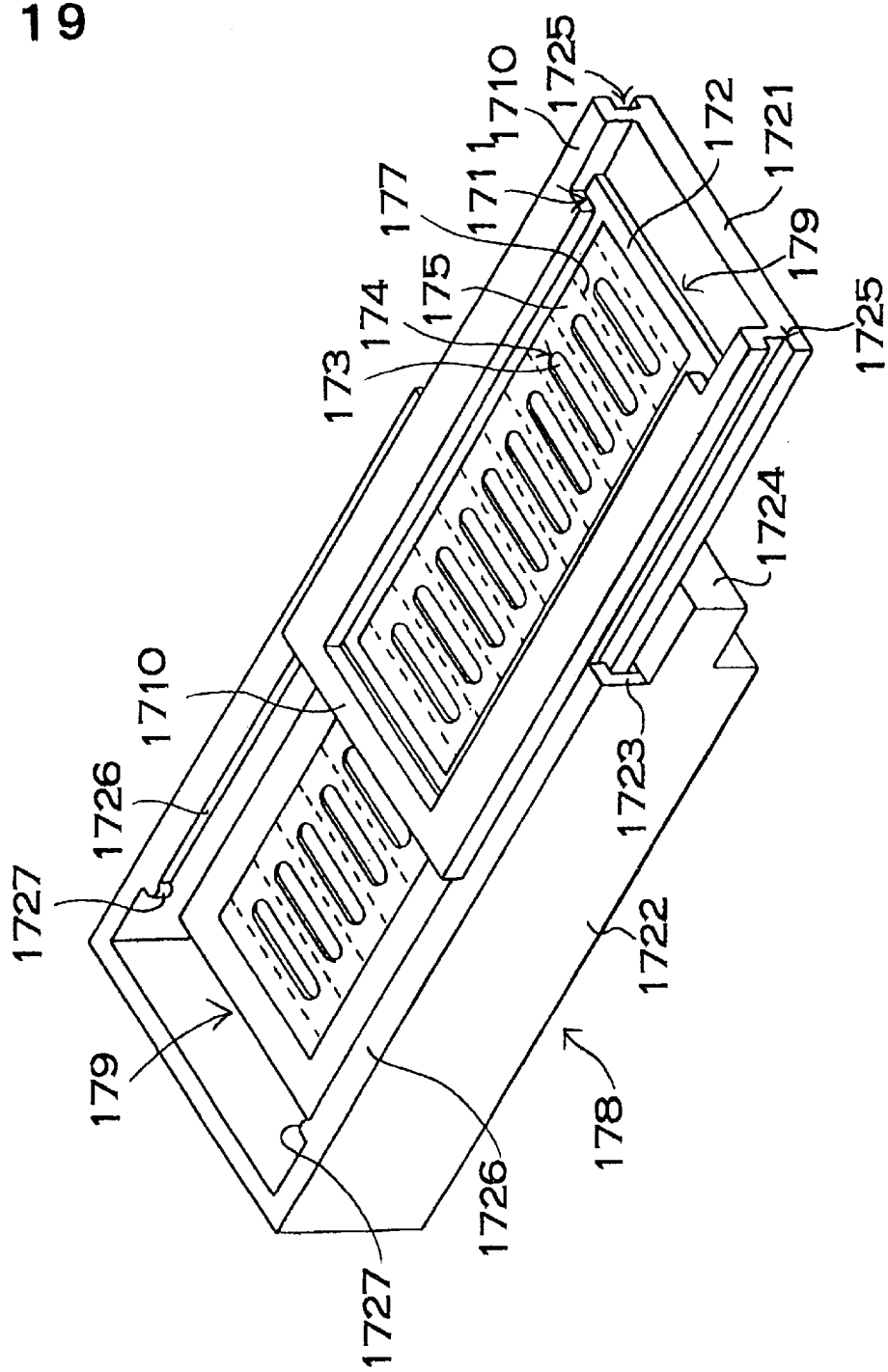
FIG. 19 is an oblique view showing the cleaning tool shown in FIG. 17 with the storage case cover opened.
Figure 20:
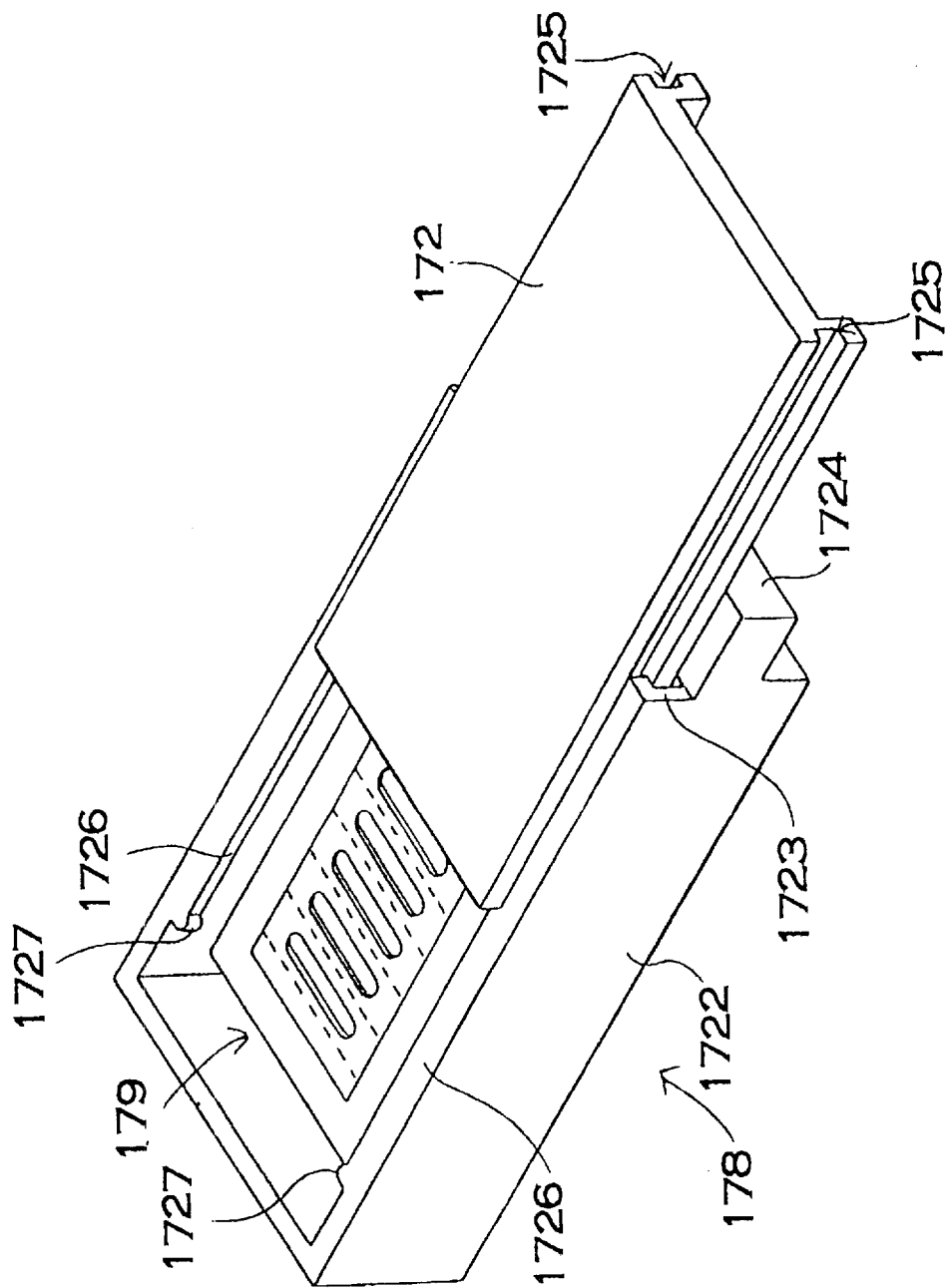
FIG. 20 is an oblique view showing the cleaning tool shown in FIG. 17 with the storage case cover of turned upside down.
Figure 21:
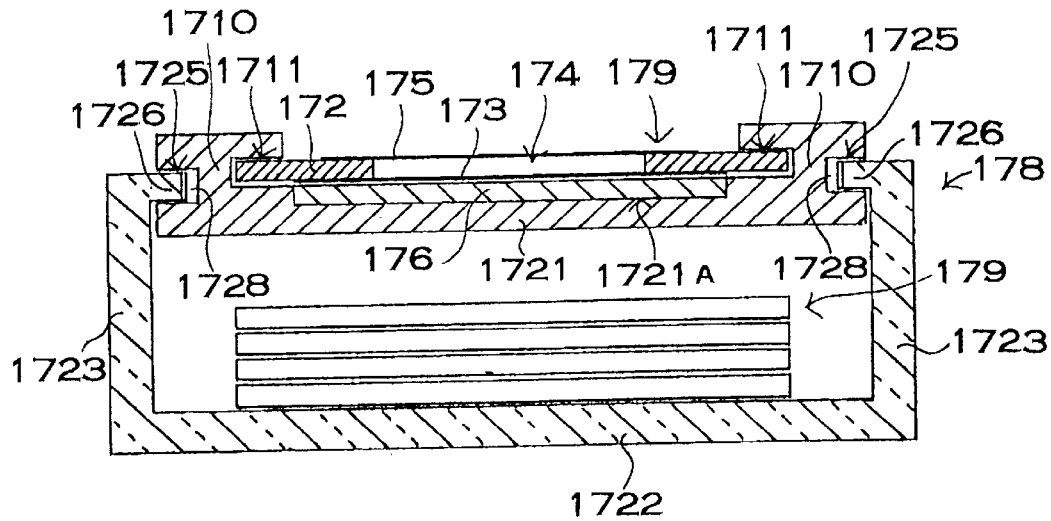
FIG. 21 is a cross section view of the cleaning tool for optical fiber connectors shown in FIG. 19.
Figure 22:
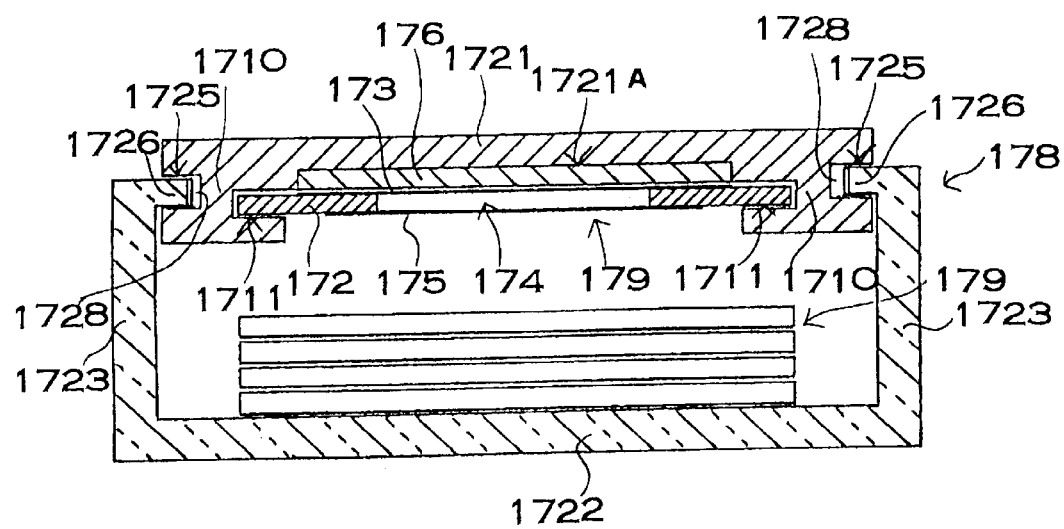
FIG. 22 is a cross section view of the cleaning tool for optical fiber connectors shown in FIG. 20.

The cleaning tool for optical fiber connectors shown in the oblique views of FIGS. 17 through 20 and the cross section views of FIGS. 21 and 22 gives a concrete embodiment of a main case which is a storage case. This cleaning tool is provided with cleaning cartridges 179 and a main case 178 which is a storage case for holding cleaning cartridges 179. Since the cleaning cartridges 179 can be the same as those used in the embodiment shown in FIGS. 9 through 11, their description is abbreviated.

The storage case, which is the main case 178, is provided with a storage box 1722 to hold a plurality of cleaning cartridge 179 layers, and a cover 1721 which attaches to the storage box 1722 to allow its open side to be opened or closed. The storage box 1722 is deep enough to hold, for example, 5 to 50 cleaning cartridge 179 layers, preferably 5 to 30 layers, and optimally approximately 10 layers. The internal size of the storage box 1722 is made slightly larger than the external outline of a cleaning cartridge 179. This is for easy storage of cleaning cartridges 179. Since the cleaning cartridges 179 of the figures are rectangular, the storage case is also made rectangular. The storage box 1722 is preferably made of plastic and formed as a single piece. Further, the storage box 1722 shown in the figures is provided with a hook at one end which is formed with the storage box 1722 as a single piece.

Figure 17:
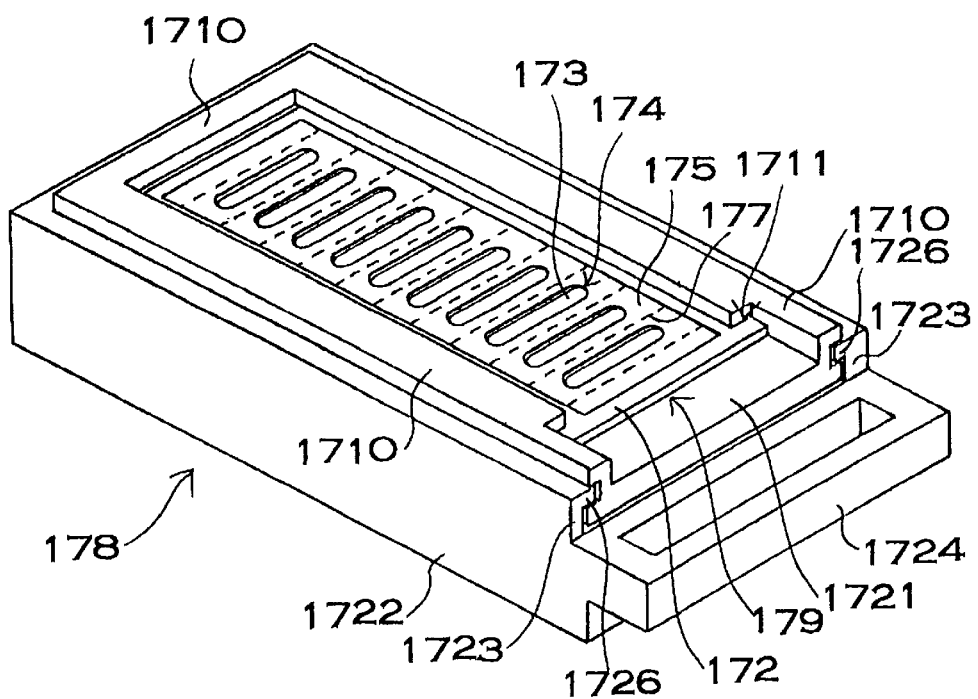
FIG. 17 is an oblique view of another embodiment of the cleaning tool for optical fiber connectors of the present invention.
Figure 18:
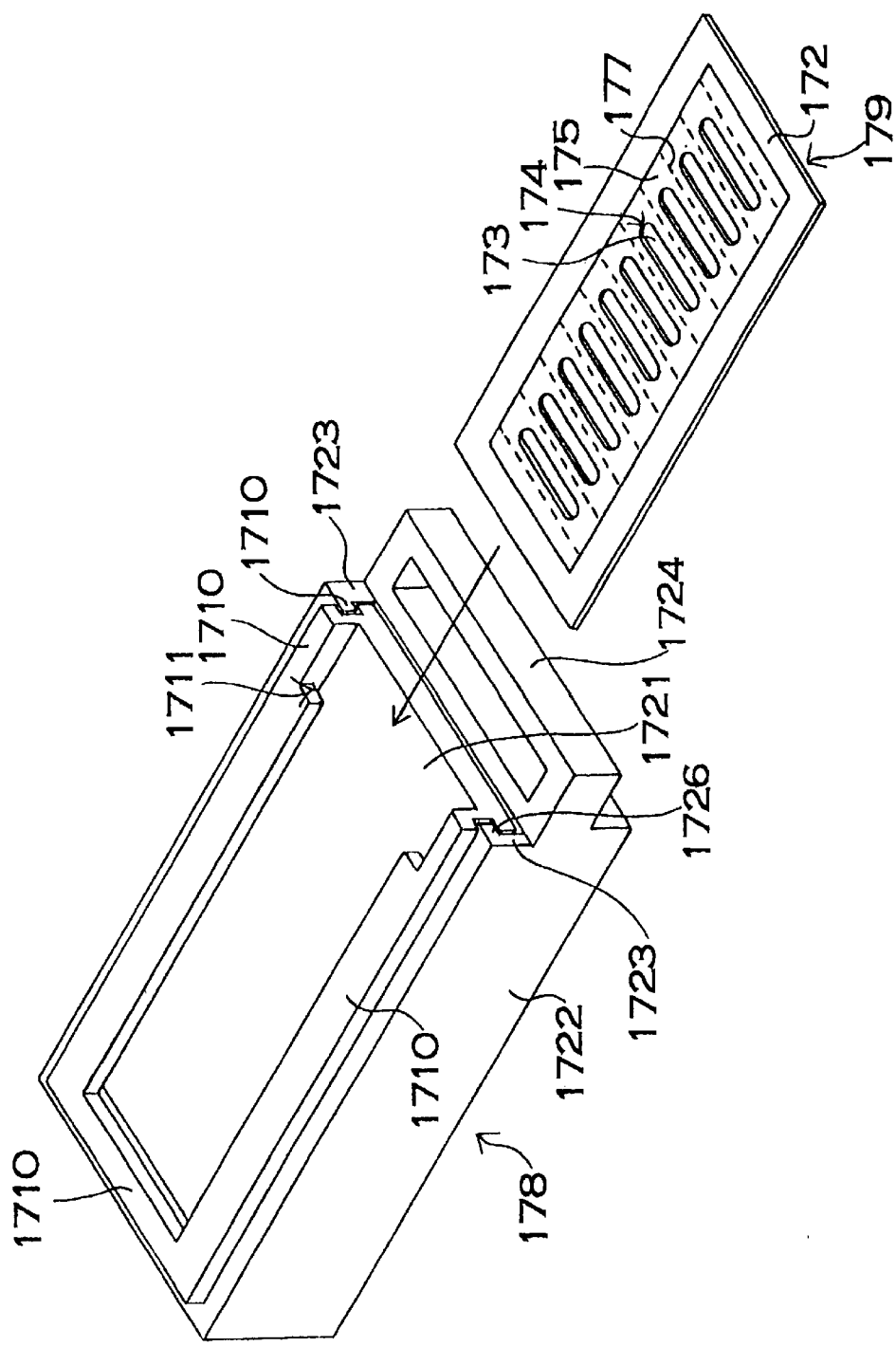
FIG. 18 is an oblique view showing a cleaning cartridge being attached to the storage case cover of the cleaning tool shown in FIG. 17.

The cover 1721 is joined to the storage box 1722 in a manner that allows it to slide open and closed within the opening in the storage box 1722. The cover 1721 of the figures has slide grooves 1725 along both sides. The slide grooves 1725 are provided extending along the sides to both ends of the cover 1721. The cover 1721 can be turned over and attached to the storage box 1722. When used for cleaning an optical fiber connector, as shown in FIGS. 17, 18, and 21, the cover 1721 is attached with the cleaning cartridge 179 side facing outward. When not used for cleaning an optical fiber connector, as shown in FIGS. 20, and 22, the cover 1721 is attached with the cleaning cartridge 179 side facing inward.

Guide projections 1726 provided on the storage box 1722 side walls 1723 insert into cover 1721 slide grooves 1725 allowing the cover 1721 to slide. The storage box 1722 of the figures is provided with guide projections 1726 along the upper edges of the side walls 1723. The rectangular storage box 1722 is provided with guide projections 1726 jutting inward from the side walls 1723 of the long sides of the rectangle. The storage box 1722 of the figures has guide projections 1726 formed on the upper ends of the side walls 1723 in an inward bent shape.

The storage box 1722 shown I FIGS. 19 and 21 is provided with catches 1727 at locations on the guide projections 1726 to retain the cover 1721 in the closed position. Similarly, catches 1728 are provided inside the slide grooves 1725. Cover 1721 movement is controlled by the slide groove 1725 catches 1728 passing the guide projection 1726 catches 1727. The position of the cover 1721 when slide groove 1725 catches 1728 pass the guide projection 1726 catches 1727 is the completely closed position. The catch-retained cover 1721 can be prevented from moving in the completely closed position. When opening the cover 1721, it is slid with some force causing the slide groove 1725 catches 1728 to pass by the guide projection 1726 catches 1727 allowing the cover 1721 to open.

Although not illustrated, the storage box cover may also be joined to the open side of the storage box via hinges. A cover which opens and closes via hinges is connected in a manner allowing cleaning cartridges to be attached or detached from either its inside surface or its outside surface.

The cover 1721 has insertion grooves 1711 along both sides to slide a cleaning cartridge 179 and attach it to the cover 1721 in a detachable manner. The cover 1721 is provided with perimeter walls 1710 on both sides and along one end. The upper parts of opposing perimeter walls 1710 are provided with c-shaped grooves to form the cleaning cartridge insertion grooves 1711. A cleaning cartridge 179 is inserted into the insertion grooves 1711 provided on the inside of the perimeter walls 1710 and attached in a fixed position on the a storage case. Although not illustrated, the cover may also be configured with a stopper near the cleaning cartridge insertion region to retain the cleaning cartridge in a fixed position. A cleaning cartridge held in a fixed position on the cover has the characteristic that it does not move out of position or slide out of the cover, and is convenient to use.

The cover 1721 Is made of plastic. A plastic cover 1721 can be formed as a single piece with perimeter walls 1710 along its boundary to provide insertion grooves 1711. However, the cover can also be fabricated from wood materials or metal. Insertion grooves can be formed in a wooden cover by laminating and bonding sheet material cut and formed to specified shapes. Insertion grooves can be formed in a metal cover by bending the perimeter of a metal sheet or providing perimeter walls by a method such as weld attachment.

The cover 1721 is made thick enough to have sufficient strength. The cover 1721 is designed with a strength that prevents deformation even when an optical fiber connector plug is moved back and forth inside a window 174 in the front plate 172 and the ferrule region is pushed strongly against the cover 1721. This is because the optical fiber connector plug end surface is cleaned by rubbing the ferrule region back and forth on the cleaning sheet 173 with pressure applied.

The cover shown in the figures has a cushion sheet 176 layered in its center region. The cushion sheet 176 has a size approximately equal to that of the cleaning sheet 173. The cushion sheet 176 is disposed in a cavity 1721A provided in the center region of the cover 1721. The cavity 1721A in the cover 1721 has a length, width, and depth which allows the cushion sheet 176 to fit into the cavity 1721A. The cushion sheet 176 is retained in a fixed position on the cover 1721 by bonding it with adhesive into the cover 1721 cavity 1721A.

The same cushion sheet 46 used in the cleaning tool shown in FIGS. 4 and 5 can be used as the cushion sheet 176. Further, the cushion sheet can also be made to push the cleaning sheet against an optical fiber connecting surface by the same configuration as previously described for the embodiments shown in FIGS. 6 and 7. However, these cushion sheets disposed within a cavity in the cover are designed to allow a cleaning cartridge to be smoothly attached or detached.

The storage case with the configuration described above is used by inserting a cleaning cartridge 179 into the cover 1721. In this storage case, the cover 1721 surface with the cleaning cartridge 179 attached is faced outward, and peel-off sheet 175 sealing off a window 174 is removed to open that window 174 when an optical fiber connecting surface is to be cleaned by the cleaning sheet 173. Cleaning sheet 173 is exposed in the opened window 174. In this state, the optical fiber connector is moved within the window 174, the optical fiber connecting surface is polished by the cleaning sheet 173, and dirt attached to the connecting surface is removed cleaning the surface.

Further, a cleaning cartridge 179 with all the cleaning regions of the its cleaning sheet 173 used, is removed from the cover 1721 and exchanged for a new one. A cleaning cartridge 179 which is used up is exchanged for an unused cleaning cartridge 179 stored inside the storage case. A cleaning cartridge 179 which is used up is either thrown away or the front plate 172 only is separated and reused.

The storage case cover of the cleaning tool described above serves the dual purpose of a base for cleaning cartridge attachment. A cleaning cartridge stored inside the storage case is attached to the cover when used. A cleaning cartridge which is used up is removed from the cover, discarded, and a new cleaning cartridge stored inside the storage case is attached to the cover. Cleaning cartridges, which use the dual purpose cover as a base, have a simple structure and can be manufactured inexpensively in quantity.

With a cleaning cartridge attached to the cover of the storage case, peel-off sheet which seals off the windows is removed to expose a window, an optical fiber connector plug is moved within the open window, and the ferrule region and plug end surface can be cleaned by the cleaning sheet In an ideal fashion. Further, a cleaning cartridge with all its cleaning regions used up is removed from the cover and exchanged for a new one stored inside the storage case in an extremely simple fashion. Consequently, the cleaning tool of the present invention has the characteristic that in addition to being compact overall and convenient to carry, the part discarded after use and the repeatedly reusable part which is not discarded are clearly distinguished, the discarded part is easily replaced, and the cleaning tool is extremely economic to use. In particular, since the cleaning cartridge of the cleaning tool described above has a simple structure, manufacturing cost per use cycles can be reduced, and manufacture in quantity can be extremely inexpensive.

Finally, the cleaning tool described above has the characteristic that since a cleaning cartridge attaches in a detachable manner to the cover of the cleaning cartridge storage box, the tool can be used in an extremely convenient fashion.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims or equivalence of such meets and bounds thereof are therefore intended to be embraced by the claims.

What is claimed is:

1. A cleaning tool for optical fiber connectors comprising:
   a front plate having a plurality of slit shaped windows therein;
   a peel-off sheet removably attached to the front plate in a manner that seals the plurality of windows in the front plate;
   a cleaning,sheet disposed under a bottom surface of the front plate; and
   a bottom plate having perimeter walls disposed under the bottom surface of the cleaning sheet,
   wherein the peel-off sheet is removably attached to the front plate in a manner allowing separate unsealing of each of the plurality of windows, and wherein the front plate is operable to be inserted inside the perimeter walls.

2. A cleaning tool for optical fiber connectors as recited in claim 1, further comprising:
   a bottom plate; and
   a cushion sheet,
   wherein the cushion sheet is between the bottom plate and the cleaning sheet.

3. A cleaning tool for optical fiber connectors as recited in claim 2, wherein the cushion sheet has protrusions coincident with the windows.

4. A cleaning tool for optical fiber connectors as recited in claim 2, wherein the cushion sheet has grooves coincident with the windows.

5. A cleaning tool for optical fiber connectors as recited in claim 1, further comprising:
   a bottom plate;
   a second front plate; and
   a second cleaning sheet,
   wherein the cleaning sheet and the front plate are on one side of the bottom plate, and wherein the second cleaning sheet and the second front plate are on another side of the bottom plate in a configuration allowing both sides to be used.

6. A cleaning tool for optical fiber connectors as recited in claim 1, further comprising:
   a bottom plate,
   wherein the front plate and the bottom plate are joined together at their outside edges.

7. A cleaning tool for optical fiber connectors as recited in claim 1, wherein the front plate thickness is 0.2 mm to 1.5 mm.

8. A cleaning tool for optical fiber connectors as recited in claim 1, wherein the cleaning sheet comprises cloth woven from minute fibers.

9. A cleaning tool for optical fiber connectors as recited in claim 1, wherein the cleaning sheet comprises non-woven fiber material.

10. A cleaning tool for optical fiber connectors comprising:
- a cleaning cartridge including a front plate having a bottom surface, an upper surface and a plurality of rows of windows therethrough, a cleaning sheet under the bottom surface and a removable peel-off sheet attached to the upper surface and sealing the plurality of windows; and
- a main case having a cleaning cartridge attachment surface,
- wherein the cleaning cartridge is detachably fastenable to the cleaning cartridge attachment surface, and
- wherein the removable peel-off sheet is operable to be removed thereby unsealing a window such that when an optical fiber connector plug is moved within the unsealed window the optical fiber connector plug ferrule region and plug end surface are cleaned by the cleaning sheet.

11. A cleaning tool for optical fiber connectors as recited in claim 10, wherein the cleaning cartridge attachment surface has a cavity, and
- wherein a cushion sheet is disposed in the cavity.

12. A cleaning tool for optical fiber connectors as recited in claim 11, wherein the cushion sheet has protrusions coincident with the windows.

13. A cleaning tool for optical fiber connectors as recited in claim 11, wherein the cushion sheet has grooves coincident with the windows.

14. A cleaning tool for optical fiber connectors as recited in claim 10, wherein the main case is configured to allow cleaning cartridges to be attached to both sides in a detachable manner.

15. A cleaning tool for optical fiber connectors as recited in claim 10, wherein the peel-off sheet is removably attached to the front plate in a manner allowing separate removal from each of the plurality of windows.

16. A cleaning tool for optical fiber connectors as recited in claim 10, wherein the front plate thickness is 0.2 mm to 1.5 mm.

17. A cleaning tool for optical fiber connectors as recited in claim 10, wherein the cleaning sheet comprises cloth woven from minute fibers.

18. A cleaning tool for optical fiber connectors as recited in claim 10, wherein the cleaning sheet comprises non-woven fiber material.

19. A cleaning tool for optical fiber connectors as recited in claim 10, wherein the main case has a bottom plate provided with perimeter walls along both sides and one end, and the perimeter walls on both sides have cleaning cartridge insertion grooves on their inside surfaces.

20. A cleaning tool for optical fiber connectors as recited in claim 10, wherein a guide tab is disposed at an end of the peel-off sheet, and
- wherein the guide tab is operable to be moved along the front plate to remove the peel-off sheet.

21. A cleaning tool for optical fiber connectors as recited in claim 20, wherein the main case is provided with perimeter walls along both sides,
- wherein the perimeter walls have guide grooves located therein, and
- wherein the guide tab is operable to be moved along guide grooves provided along the perimeter walls on both sides.

22. A cleaning tool for optical fiber connectors as recited in claim 10, wherein the main case comprises a storage case operable to store cleaning cartridges.

23. A cleaning tool for optical fiber connectors as recited in claim 22, wherein the storage case comprises a storage box and a cover,
- wherein the storage box has an open region and is operable to store a plurality of cleaning cartridge layers, and
- wherein the cover is operable to be attached to the open region of the storage box in a manner allowing the cover to open and close.

24. A cleaning tool for optical fiber connectors as recited in claim 23, wherein the cover has an outside surface, an inside surface and an attachment region on its outside surface, and
- wherein the attachment region is operable to permit detachable attachment of a cleaning cartridge.

25. A cleaning tool for optical fiber connectors as recited in claim 23, wherein the cover is operable to be joined to the storage box by sliding within the open region of the storage box in a manner allowing the cover to open and close.

26. A cleaning tool for optical fiber connectors as recited in claim 25, wherein the cover has slide grooves along its edges on both sides,
- wherein opposing storage box side walls comprise guide projections operable to insert into the slide grooves in a manner allowing the cover to slide, and
- wherein the cover is joined to the storage box in a manner allowing it to open and close by inserting the guide projections in the slide grooves.

27. A cleaning tool for optical fiber connectors as recited in claim 23, wherein the cover has perimeter walls on both its inside surface and its outside surface,
- wherein the perimeter walls have insertion grooves along opposing surfaces, and
- wherein the insertion grooves of the perimeter walls are operable to permit detachable attachment of cleaning cartridges to both sides of the cover.

* * * * *